United States Patent [19]

Welch

[11] 3,992,246

[45] Nov. 16, 1976

[54] SOLAR EVAPORATOR

[76] Inventor: Milton C. Welch, P.O. Box 37, Toomsuba, Miss. 39364

[22] Filed: Dec. 9, 1974

[21] Appl. No.: 531,139

[52] U.S. Cl. ............................. 159/1 S; 159/13 R; 159/4 R
[51] Int. Cl.² ...................... B01D 1/00; B01D 1/22; B01D 1/16
[58] Field of Search ......................... 159/13, 32–34, 159/38, 13 R, 4 R, 45; 202/234; 203/DIG. 1; 23/2.95 S

[56] References Cited
UNITED STATES PATENTS

| 175 | 5/1835 | Cooper ............................. 159/1 S |
|---|---|---|
| 1,056 | 12/1838 | Harrison ............................. 159/32 |
| 681,407 | 8/1901 | Coward ............................. 203/DIG. 1 |
| 737,551 | 8/1903 | Blanchard ............................. 159/1 S |
| 2,780,281 | 2/1957 | Reinert ............................. 159/4 F |
| 3,190,816 | 6/1965 | Adamec ............................. 202/234 |
| 3,192,133 | 6/1965 | Adamec ............................. 203/DIG. 1 |
| 3,194,228 | 2/1964 | Bargues ............................. 159/1 S |
| 3,211,633 | 10/1965 | Hammer et al. ............................. 159/4 F |
| 3,314,862 | 4/1967 | Hay ............................. 159/1 S |
| 3,337,418 | 8/1967 | Halacy, Jr. ............................. 203/DIG. 1 |
| 3,841,976 | 10/1974 | Scott et al. ............................. 202/234 |

FOREIGN PATENTS OR APPLICATIONS

| 1,247,270 | 10/1960 | France ............................. 159/1 S |
|---|---|---|
| 2,053,982 | 4/1971 | France ............................. 202/234 |
| 2,951 | 1879 | United Kingdom ............................. 159/16 R |

OTHER PUBLICATIONS

The Sun at Work – 1960 Arizona State University, Tempe Newsletter of the Association for Applied Solar Energy.
International Symposium on Water Desalination, 10/3–9/1965 Wash. D.C. SWD84 "Solar Distillation-A Review of Batelle Experience" J. W. Bloemer et a., pp. 4, 5, 9.

*Primary Examiner*—Jack Sofer
*Attorney, Agent, or Firm*—Dowell & Dowell

[57] ABSTRACT

A solar evaporator for recovering minerals from a solution or liquid mixture including one or several stages, each having a large evaporative surface on which the solution sprayed, the surface being dark colored to absorb solar energy and the surface inclining toward a vat which catches the unevaporated solution draining from the surface. The surface is corrugated to shed precipitated minerals into its furrows where the returning solution entrains the mineral crystals and carries them back to the vat where they settle out to the bottom and await harvesting. The apparatus includes means to prevent entry of rainwater into the vat and to drain the rainwater away from the solution in the vat.

9 Claims, 5 Drawing Figures

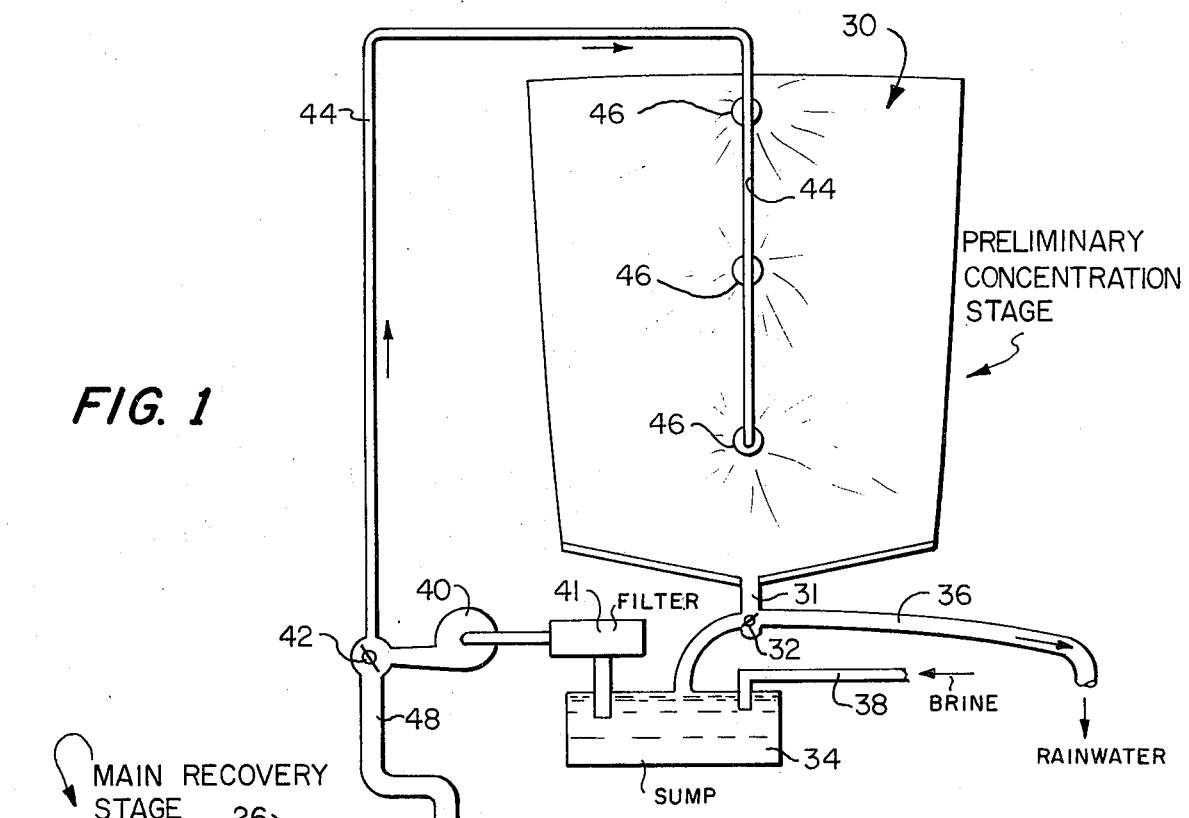
FIG. 1
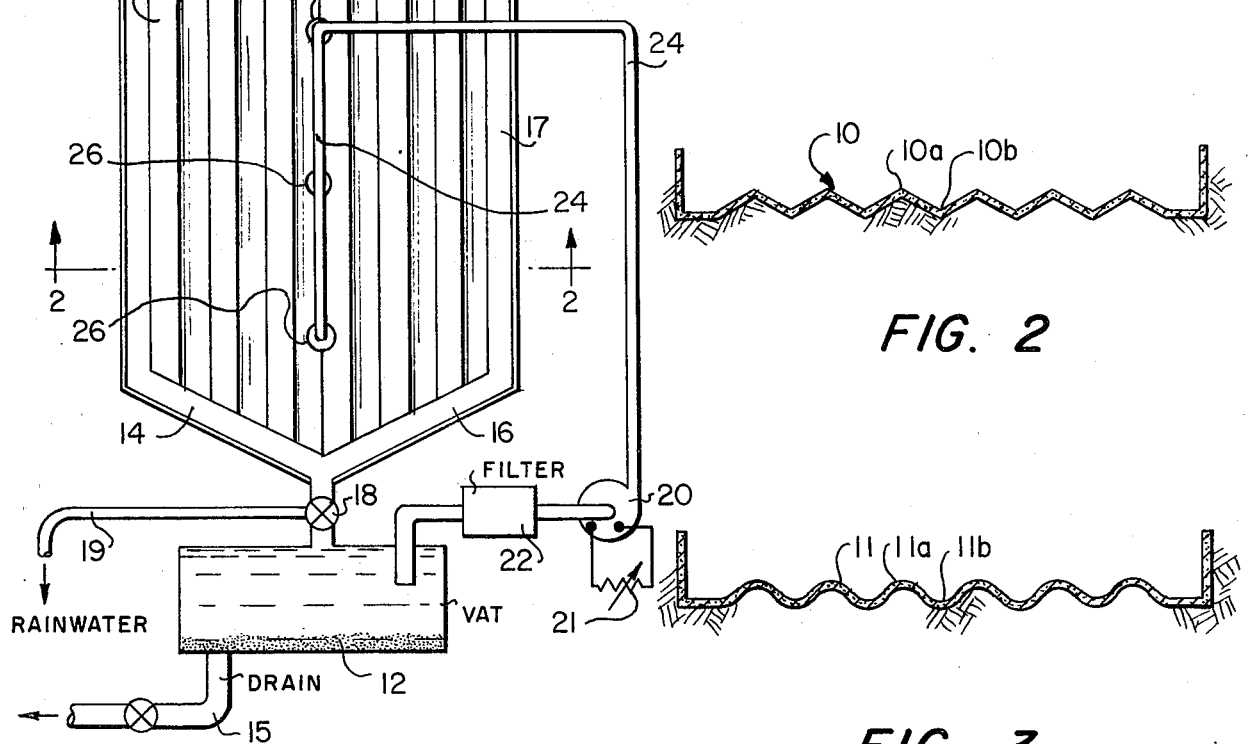
FIG. 2
FIG. 3

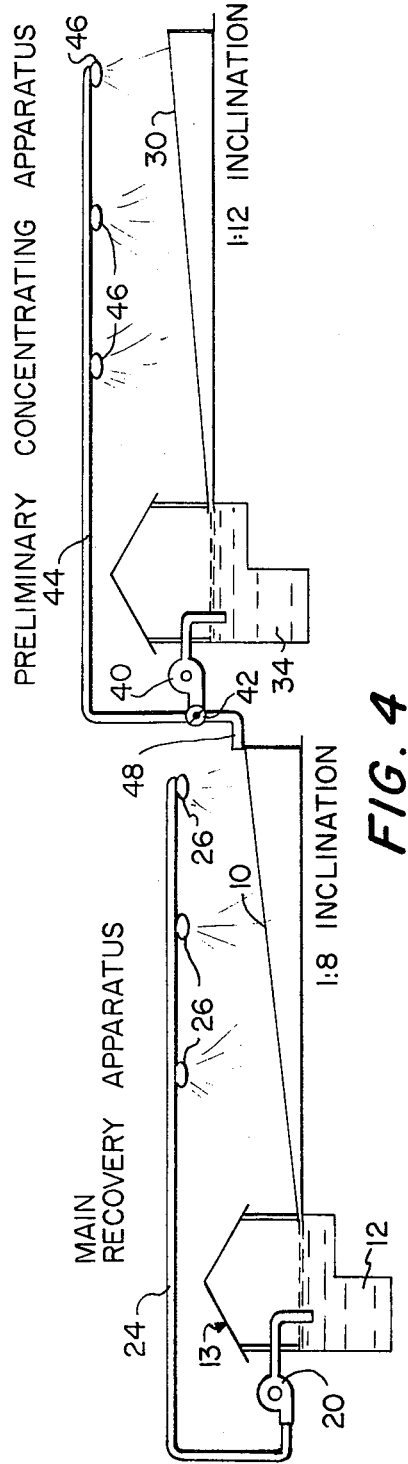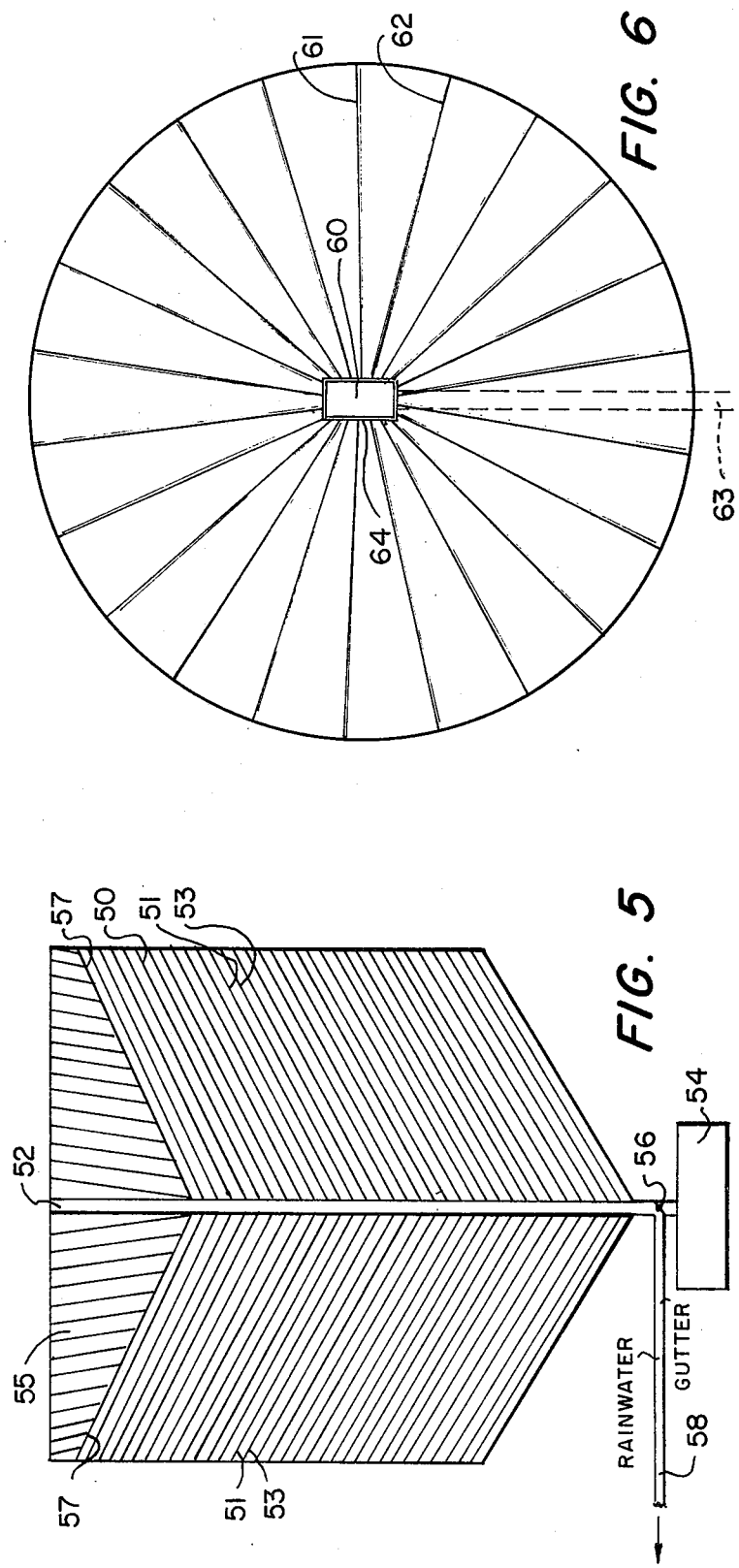

SOLAR EVAPORATOR

FIELD OF INVENTION

This invention relates to improved solar evaporator apparatus for the concentration and recovery of mineral in a solution, and more particularly to apparatus having improved efficiency and rate of operation.

BACKGROUND AND PRIOR ART

Although the present apparatus is suitable for separating minerals from various solutions or mixtures, it will be described for illustrative purposes in connection with the recovery of salt by evaporation. There are three commonly used salt recovery processes including mining evaporation from solution using artificially generated heat which has become very expensive, and solar evaporation. This invention is of the latter type and is intended to replace in part or whole these prior art processes for recovery of salt or other minerals, especially those using scarce artificial heat sources for evaporative purposes. One prior art approach has been to confine sea water in a large shallow pond, and to harvest the salt after the water has completely evaporated. However, this approach is practical for use only in very arid regions, since in high rainfall areas the partially evaporated level would be frequently diluted. The improvements of this invention solve the latter problem while raising the efficiency of evaporation to a relatively higher rate. Typical prior art evaporative systems are shown in U.S. Pat. Nos. 681,407 to Coward; 737,551 to Blanchard; 1,491,068 to Schilling; and 1,506,946 to Schilling in which the objective is the recovery of salt. Other patents which are more directed toward the distillation and recovery of a liquid include U.S. Pat. Nos. 631,461; 102,633; 2,383,234; 3,167,488 and 3,278,396.

The present invention seeks to optimize the rate of evaporation by using dark-colored surfaces and regulating the sprayed solution so as to provide a thin film of almost zero depth upon the evaporative surface so that the sprayed film is quickly heated throughout its depth, but is thin enough not to unduly cool the surface. Other problems solved in this invention are the shaping of the surface in such a way as to expedite the recovery of salt which is deposited as precipitate on the evaporative surface, and the protection of the process and apparatus from rainfall.

THE INVENTION

In simplest terms, the apparatus of this invention includes a large evaporative surface, dark-colored to absorb a maximum amount of solar energy, and the surface being inclined to drain into a vat containing the solution. A pump draws the solution from the vat and delivers it to spraying apparatus which continuously wets the evaporative surface with the solution, but only to a thin film depth. The solution is therefore concentrated and mineral is precipitated out onto the surface. The mineral would tend to remain deposited thereon as a crust if it were not for the special shaping of the surface, i.e. corrugation thereof to provide ridges and furrows so that the sides of the corrugations slant into the furrows more steeply than the surface as a whole inclines toward the vat. As a result the film of solution moves rapidly toward furrows and entrains the precipitated mineral and carries it toward the vat. When rainfall occurs the run-off from the surface is diverted to a drainage gutter which carries it away from the vat, the latter being covered to prevent dilution of its contents by the rainwater.

It is the principal object of this invention to provide an improved solar evaporator operative to recover mineral content from a solution at a much higher rate than prior apparatus, and to recover it very economically since the only artificial power consumed in the system is the small amount of power required to pump the solution through the sprayers.

Another important object of the invention is to provide apparatus in which the evaporative surface, color, inclination, and corrugated shape have been optimized.

Still a further major object of the invention is to interrelate the shape of the surface corrugations and the rate of pumping of the solution through the spraying apparatus so as to maintain the surface corrugations wet with a very thin depth of the solution on the surface to enhance evaporation while still providing enough run-off draining from the surface to entrain precipitated mineral and carry it back to the vat, where it settles to the bottom awaiting harvesting.

Yet a further object of the invention is to provide apparatus usable in non-arid country, wherein the recovery vat is covered and protected from rainwater dilution, and wherein valve means are provided for diverting rainwater run-off from the surface into gutters which carry it away from the vat.

One of the most important objects of this invention is to provide a way of saving tremendous amounts of scarce and expensive artificial heat fuels now being used to evaporate water from solutions for mineral recovery, and to provide a way of economically evaporating waste polluted water from industrial plants into the atmosphere as pure water vapor to thereby recover the chemicals and other effluents which were dissolved or strained therein, thereby to protect our rivers, lakes and streams.

Another important object of the invention is to provide several such apparatus selectively connected together so that solution passes sequentially through them, such apparatus including for instance, a preliminary stage which the solution is concentrated to a level approaching saturation, and this concentrated solution then being fed into a subsequent stage in which the apparatus serves to recover the mineral content and collect it in its vat.

Other objects and advantages of the invention will become apparent during the following discussion of the drawings, wherein:

THE DRAWINGS

FIG. 1 is a plan view of a two-stage solar evaporator apparatus according to the invention;

FIG. 2 is a cross-sectional view, somewhat enlarged, of an evaporative surface taken along line 2—2 of FIG. 1;

FIG. 3 is a sectional view similar to FIG. 2, but showing an evaporative surface having a modified contour;

FIG. 4 is an elevation view of apparatus similar to that shown in FIG. 1;

FIG. 5 is a plan view of apparatus having a further modified evaporative surface; and FIG. 6 is a plan view of still another embodiment employing a further modified evaporative surface.

Referring now to the drawings, FIG. 1 shows apparatus having two separate stages including a preliminary concentrating stage in the upper part of the figure and a main mineral recovery stage in the lower part of the figure.

The main mineral recovery stage will be described first since it can be used alone without any preliminary stage. The evaporative surface shown in FIG. 1 at the reference numeral 10 comprises a large surface area, perhaps plowed from a field having the proper general inclination. This surface is constructed of asphalt black-top, metal, or plastic, or perhaps even concrete, any one of these surfaces having been blackened, dyed or painted, so that it will absorb the maximum amount of solar heat energy. The surface slopes generally toward the lower part of the drawing at which there is located a vat 12. The surface also includes channels 14 and 16 designed to receive the run-off from the main evaporative surface 10 and direct it into the vat through a valve 18 which is normally opened in such direction as to allow the run-off to enter the vat 12. However, in case of rain the valve 18 can be reversed so as to direct rainwater run-off into a gutter pipe 19 where it is discharged away from the vat 12. The evaporative surface 10 must have sufficient inclination toward the channels 14 and 16 and toward the vat 12 so that all run-off will drain into the vat, this run-off comprising a concentrated brine in which there is entrained precipitated minerals in solid form. The storage capacity of the vat 12 is of course made sufficient to handle the quantity of solution to be processed at any particular time, and as shown in FIG. 4 the vat 12 is preferably made deep and not too large in area because it requires a cover, for instance in the form of a roof 13 over it to keep out rainwater. FIG. 4 also shows the slope of the evaporative surface 10, and this slope is preferably made to lie within the range of 1:6 to 1:10, and preferably about 1:8.

A pump 20 draws brine from the vat 12, preferably through a filter 22 intended to remove any material not in solution including floating material such as leaves or sticks, and the pump 20 pumps this brine into piping 24 which is fitted with a number of orifice means, such as the nozzles 26 by which the brine is sprayed onto the evaporative surface 10 from the piping 24, the nozzles being directed either upwardly or downwardly. In FIG. 1 there is shown a rheostat 21 which is adjustable to change the pumping rate, and thereby adjust the rate at which the solution is sprayed onto the evaporative surface so as to keep the surface wet with a thin film having almost zero depth, which film is very conducive to evaporation. On the other hand, the quantity of solution sprayed upon the evaporative surface 10 must be sufficient that any minerals which have crystallized out of solution on to the surface 10 will be entrained in the flow of liquid and brought back to the vat. It will be seen in the vat 12 in FIG. 1 that there is a salt deposit in the bottom, which deposit grows and can be harvested manually from the vat, or else removed by any other suitable means. If desired, the vat can also be provided with a drain 15 useful for cleaning purposes. It should be recognized that the spraying of the solution on to the surface 10 can be either intermittent or continuous.

If the solution is not initially near saturation, it can be concentrated toward saturation by simply allowing the process to continue so that more and more of the liquid evaporates as time goes by. However, it may be desirable to provide a preliminary concentrating stage as shown in the upper portion of FIG. 1, especially where a solution such as brine is not initially very close to saturation. The preliminary concentration stage can be identical to the main recovery stage just described, or it may be somewhat different in its details. In the one shown in FIGS. 1 and 4, the evaporative surface 30 is inclined downwardly toward an exit pipe 31 and a selective valve 32 which can be turned in the direction shown in the drawing to discharge the solution into a sump 34, or can be reversed in the other direction so as to discharge rainwater out through a gutter 36 and away from the sump vat 34. Water will be initially introduced into the sump 34 through a pipe 38, which can lead from a pump drawing brine from a source thereof, or alternatively water from the ocean (the pump not being shown).

The unconcentrated solution in the sump 34 is withdrawn therefrom by a pump 40 through another filter 41, and the discharge from the pump 40 is normally directed by a valve 42 upwardly into piping 44 where it is sprayed through spraying means 46, again for example, comprising suitable nozzles. Normally, the valve 42 is left in the position shown in the drawing in which it directs the discharge from the pump 40 into the piping 44, and the system is allowed to operate to concentrate the solution until it approaches saturation. When it is near saturation, the valve 42 is reversed and the discharge from the pump 40 then passes downwardly through the pipe 48 where it runs along the channel 17 and into the vat 12 to replace solution evaporated from the main recovery stage. After the transfer of solution from the pump 34 to the vat 12 has been accomplished, the valve 42 is again set to the position shown in FIG. 1 and a new solution is entered into the sump 34 through the pipe 38. The system can be modified slightly to permit the continuous spraying of the brine through the nozzles 46 by providing a separate pump drawing from the sump 34 which can be operated to pump brine from the sump 34 to the vat 12, thereby leaving the pump 40 free to continuously supply brine to the nozzle 46. In this case a partition should be used to partially separate in the vat 34 the brine inlet pipe 38 from the newly added pump so that the newly entered brine doesn't tend to mix rapidly with the more concentrated brine.

Although the preliminary stage and the main stage are similar to extent that their basic function is to evaporate the liquid from the solution, the main stage has an evaporative surface 10 which is especially designed for moving the crystallized salt from the evaporative surface into a flow of solution travelling back to the vat which entrains the separated crystalline precipitate. However, the evaporative surface 30 in the preliminary stage is not particularly concerned with the moving of precipitated crystals back toward its sump 34 because of the fact that the solution is not yet fully saturated, and it is not contemplated that very much crystallizing out of the salt will occur during its performance. With reference to FIG. 4 it will be seen that there is another difference which is important, namely, that the evaporative surface 10 is more steeply inclined toward the vat 12 than the evaporative surface 30 of the preliminary stage, whose inclination towards the sump is much less steep, namely, about 1:12 to 1:200 approximately. The shallower inclination of the surface 30 is helpful since it permits the solution to remain in contact with the surface for a longer period of time since the run-off from the surface is slower.

FIG. 2 shows the corrugations as illustrated in FIG. 1 for the surface 10, and these corrugations are slanted from their ridges 10a to their furrows 10b at a slant angle which is much steeper than the general inclination of the surface 10 toward the vat 12. The slant toward the furrows 10b requires considerable steepness because this is the slant which moves the crystallized salt into the furrows 10b in which there will be a substantial stream of the solution heading back toward the vat 12. The showing in FIG. 3 is somewhat similar except that the corrugations 11 are undulating between their ridges 11a and their furrows 11b but the average inclination between the ridges 11a and the furrows 11b ought to be in about the same angular range as they are for the triangular corrugations as shown in FIG. 2. This slant should be somewhere in the vicinity between 10° and 30°, 20° being a reasonable value. As pointed out above, the principal purpose of the slant of these corrugations toward their furrows is to make it easy for the sprayed solution to divert separated salt from the tops and sides of the corrugations down their slopes toward the bottom furrows of the corrugations so that the liquid flowing in the furrows will entrain the salt and carry it back to the vat. In the absence of the corrugations, the flow of precipitated crystals would be uneven, and some of the crystals would not be washed back toward the vat at all. In any event, the slant of the corrugations should never be less than the inclination of the entire evaporative surface toward the vat.

Fig. 5 shows a somewhat modified evaporative surface generally referred to by the reference character 50 and including a central channel 52 which leads into a vat 54 through a valve 56 which can be thrown to drain off rainwater via the gutter 58. The evaporative surface 50 is in a kind of herringbone shape in which the corrugations provide troughs and ridges which are inclined generally toward the vat 54, but which also slope toward the channel 52. The ridges 51 drain into the troughs 53 so that the liquid runs toward the channel 52, and this is true on both sides of the channel. Moreover, a still different set of corrugations 55 can be provided in the ends of surface 50, and these corrugations drain downwardly toward the last furrow 57 on each side of the channel 52. The showing in FIG. 5 illustrates the manner in which a field having several different natural slopes in it can be shaped to provide efficient evaporative surfaces channeling the solution back into the vat 54.

FIG. 6 shows another possible modification in which the vat 60 is located in the center of the evaporating surface which surrounds it and provides alternating ridges 61 and furrows 62 all draining toward a channel 64 which goes around the vat 60 and collects the liquid which drains from the various ridges 61 into the furrows 62. Access to the vat 60 can be had through radial pipes 63 shown in dashed lines.

This invention is not to be limited to the exact embodiments shown in the drawings, for changes may be made therein within the scope of the attached claims.

I claim:
1. Apparatus for recovering minerals from a solution in water by evaporative concentration of the solution resulting in precipitation of minerals therefrom, comprising:
 a. a vat for receiving and containing said solution;
 b. a large evaporative surface located adjacent said vat, the surface being dark in color to absorb ambient solar radiation and being inclined downwardly toward the vat with a steepness in the range of 1:6 to 1:10 with respect to the horizontal to provide drainage of the solution thereinto, and the evaporative surface being corrugated to provide alternate ridges and furrows wherein the furrows drain toward the vat and the ridges slant into the furrows at angles which are steep as compared with the angle at which the evaporative surface is inclined toward the vat, the average slant of the surfaces extending from the ridges to the furrows being between 10° and 30° with respect to horizontal;
 c. solution spraying means including piping having spray orifices therein operatively directed to distribute sprayed solution so that it impinges upon and wets most of the corrugated surface; and
 d. pump means operative to draw solution from the vat and discharge it into said piping at a rate such that said spraying means maintains the ridges of the corrugated surface sufficiently wet that the solution draining from the ridges toward the furrows entrains and carries with it minerals precipitated on the corrugated surface.

2. Apparatus as set forth in claim 1, wherein said evaporative surface surrounds the vat and is downwardly inclined essentially radially toward it.

3. Apparatus as set forth in claim 1, wherein said surface includes channel means extending into the vat, and said furrows intersect with said channel means and discharge solution thereinto.

4. Apparatus as set forth in claim 1, wherein said corrugated surface comprises corrugations which form approximately the equal legs of isosecels triangles in cross-sectional profile.

5. Apparatus as set forth in claim 1, wherein said corrugated surface comprises corrugations which are undulating in cross-sectional profile.

6. The apparatus as set forth in claim 1, wherein said surface is located out of doors and disposed to collect heat radiated by the sun, and said surface includes channel means located to collect solution from said furrows and channel it into the vat; a gutter means disposed to discharge away from the vat; and valve means operative for selectively coupling the channel means to the vat, or for coupling the channel means to the gutter means to deflect rainwater from the vat.

7. Apparatus as set forth in claim 6, wherein the vat has means covering it to prevent the entry of rainwater thereinto.

8. Apparatus as set forth in claim 1, further including preliminary solution-concentrating apparatus comprising, a sump for receiving solution to be concentrated, a large evaporative area dark-colored to absorb ambient solar radiation, the area being inclined downwardly toward the sump to drain solution thereinto; second spraying apparatus directed to discharge sprayed solution over most of the area; a second pump operative to draw solution from the sump and having an outlet; and a selector valve connected to said outlet and operative in one position to direct the solution from the second pump into said second spraying apparatus and operative in another position to direct the solution from the second pump to said vat.

9. Apparatus as set forth in claim 8, wherein the inclination with respect to horizontal of the said evaporative surface is about 1:8 and the inclination of the said area is equal to or less than about 1:12, and wherein said surface and said area comprise portions of the earth's surface contoured to provide the recited inclinations.

* * * * *